Patented Apr. 5, 1949

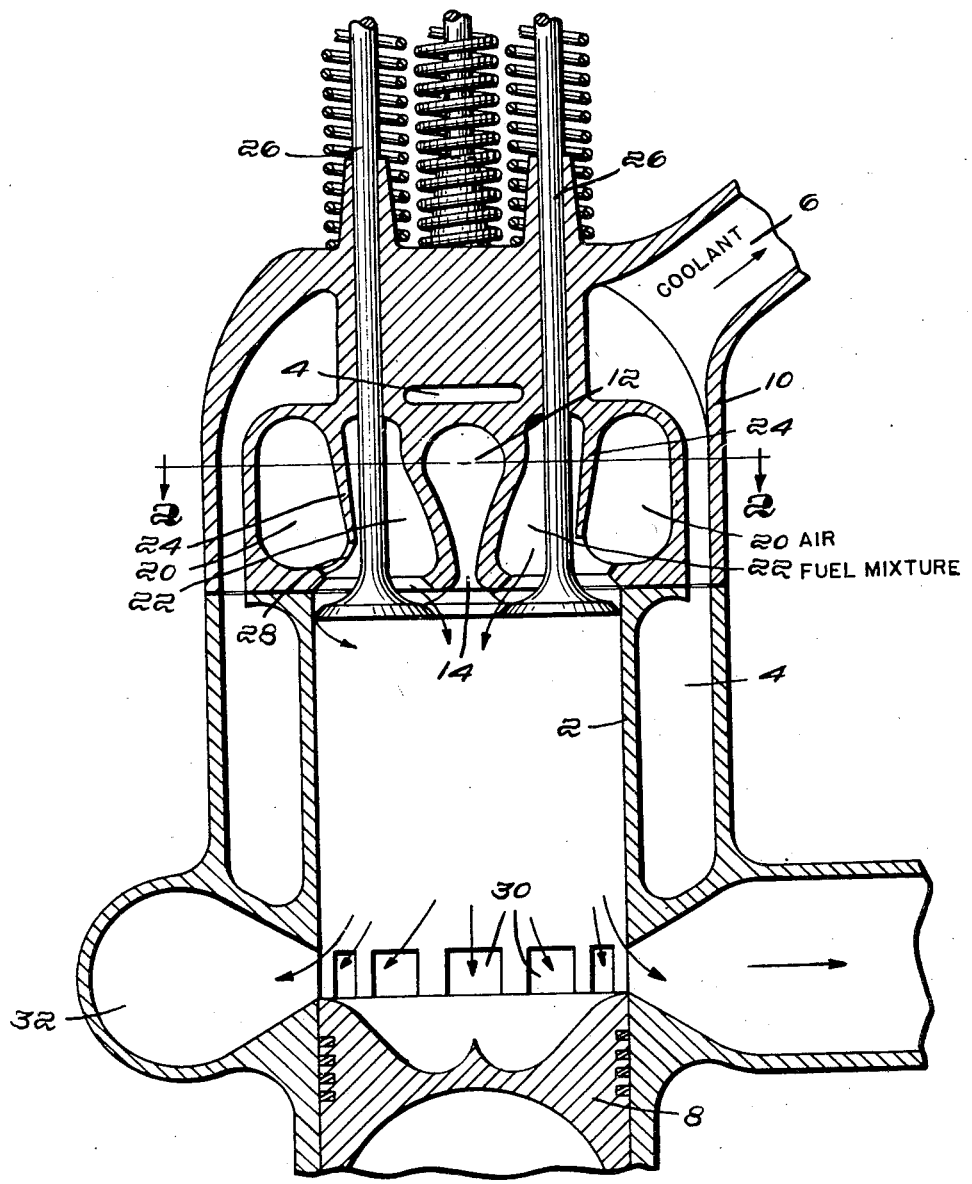

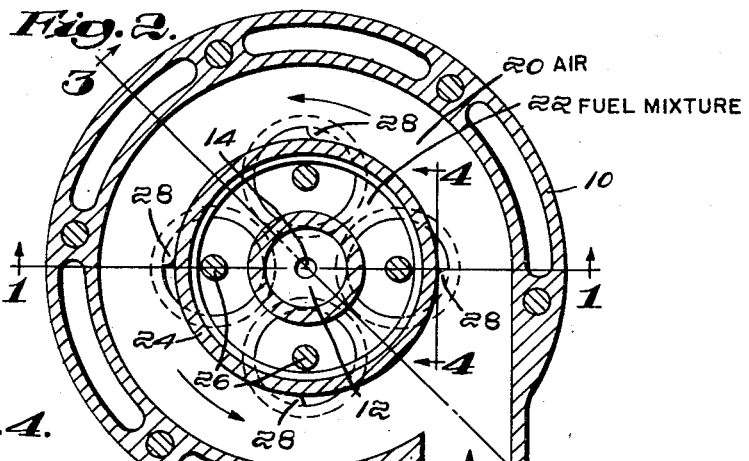
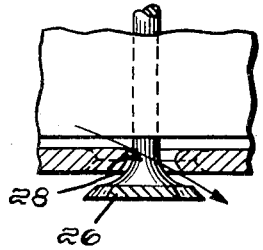
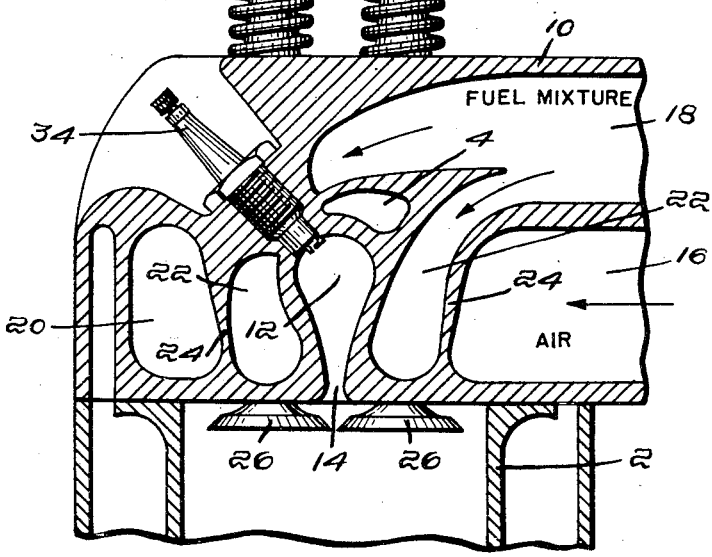

2,466,181

UNITED STATES PATENT OFFICE 2,466,181

MEANS FOR INDUCTING AND STRATIFYING WORKING GASES IN INTERNAL-COMBUSTION ENGINES

Lockwood Myrick, Boston, Mass.

Application November 14, 1946, Serial No. 709,844

8 Claims. (Cl. 123—75)

My invention has to do with means for inducting and stratifying working gases in internal combustion engines.

More particularly it concerns those engines in which the combustible gas and the combustion-supporting gas are stratified by the axial rotation of the latter about the former, as described in my co-pending patent application Serial No. 692,972.

Still more particularly, it concerns reciprocating engines, of either the two-stroke cycle or the four-stroke cycle, whose inlet ports for the air charge and for the fuel charge are controlled by poppet valves in the cylinder head.

As specified in the said patent application, the air is made to rotate within the cylinder and about its axis by giving its inlet passage a strong tangential component, or by shrouding its poppet valves, or by both; and the combustible mixture may be directed to the axial region by giving its inlet passages a strong radial component, or by shrouding its poppet valves on their sides which are toward the cylinder's periphery, or by both. But when one gas thus enters tangentially through one set of poppet valves and the other gas enters radially through a second set of poppet valves, each gas makes effective use of only about one half the area of its port openings. There is also danger that at part loads the combustible mixture will not be completely stratified from the excess air.

One object of this present invention is to increase the effective area of the intake openings into the cylinder from about 50 per cent of their actual total area to about 75 per cent, thereby decreasing the number and/or size of intake valves required for operating the engine at any one R. P. M., and increasing the R. P. M. which can be obtained with any one number and/or size of intake valves.

A second object is to improve the stratification of the air charge and the combustible charge, and to lessen their interference and mixing with each other in the intake stage.

These objects I accomplish by using the same valve or valves for both charges, admitting the combustible mixture through a segment of each valve aperture facing the cylinder axis, and admitting—at least, at part loads—the air through half of the remaining segment of such aperture. If there are two or more such intake ports, the passages which supply them with air may be combined into a single passage; and likewise with the passages for supplying the combustible mixture. Especially with a two-stroke cycle engine having three or four intake valves in the cylinder head, this enables the combustible mixture to be admitted centrally and symmetrically, the air being admitted tangentially outside this combustible mixture, thus reducing to a minimum the mixing of the two charges.

Other characteristics and features will appear as the description proceeds; and it is intended to point out particularly in the appended claims all the features of patentable novelty which exist in the disclosure herein made.

As the invention can be applied in various structural arrangements, the accompanying drawings show several illustrative embodiments, to which, however, the patent is not limited, except as indicated by the appended claims.

In the drawings:

Figure 1 is a side elevation in medial section, being on the line 1—1 of Figure 2, through the cylinder portion of a two-stroke cycle uniflow spark-ignition engine embodying my invention, the spark plug being not shown;

Figure 2 is a plan of the cylinder head in section along the line 2—2 of Figure 1;

Figure 3 is a side elevation of the cylinder head in medial section along the line 3—3 of Figure 2;

Figure 4 is an elevation of an intake valve, sectioned along the line 4—4 of Figure 2;

Figure 5:
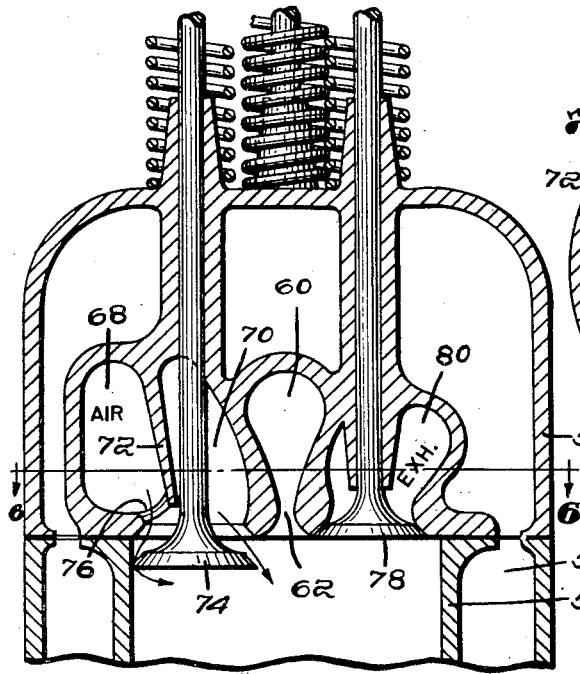
Figure 5 is a side elevation in medial section, on the line 5—5 of Figure 6, through the cylinder head of a four-stroke cycle spark-ignition engine embodying my invention, the spark plug being not shown.
Figure 6:
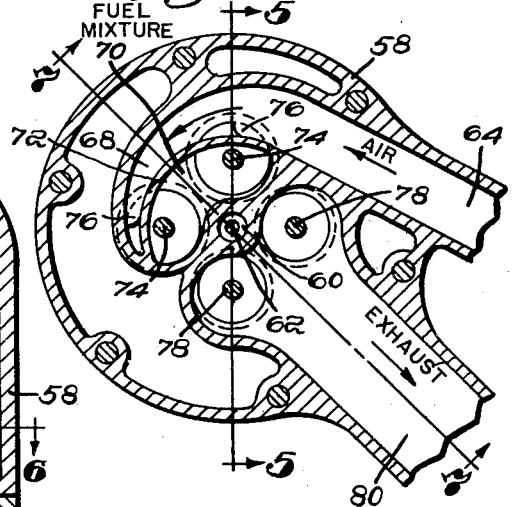
Figure 7:
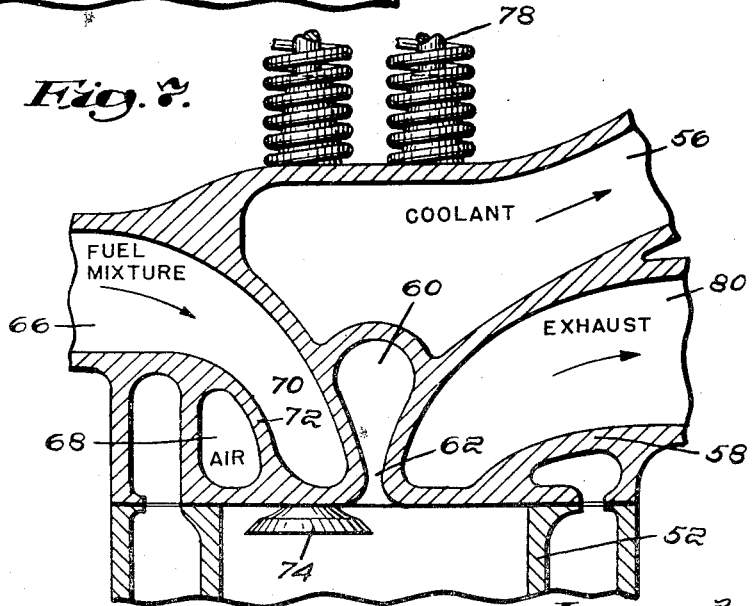

Figure 6 is a plan of the cylinder head in section along the line 6—6 of Figure 5, drawn to three-quarters the scale of Figures 5 and 7; and Figure 7 is a side elevation in medial section of the same cylinder head along the line 7—7 of Figure 6.

The two-stroke cycle, uniflow spark-ignition engine, as shown in Figures 1–3, has exhaust ports 30 (Figure 1) exposed by piston 8 near the outer end of stroke; and it also has four intake poppet valves 26 in the cylinder head 10 operated by suitable means (not shown), having a minimum of clearance between their heads and the cylinder periphery, and opening into the cylinder both from the annular inlet passage 20 for the air and from the central inlet passage 22 for the combustible mixture. Separating inlet passage 20 for the air from inlet passage 22 for the combustible mixture, is a circular partition 24 (Figures 1-3), which is coaxial with the cylinder, and which divides the entrance to the aperture of each valve 26 into two segments. One of these segments faces the cylinder periphery, and delivers air from inlet passage 20 to the cylinder's peripheral region; the other segment faces the cylinder axis, and delivers the combustible mixture from inlet passage 22 to the cylinder's axial region. The lower inside edge of partition 24 is close to the stems of valves 26. Its bottom fits and just clears the back surface of the head of each valve 26 when that valve is seated, for preventing interflow between the passages 20 and 22. For stream-line flow of air in passage 20 the partition 24 excludes from that passage the stems of the four valves 26; and that passage is everywhere uniform in its cross section, except as it may be slightly modified at its outlets to the valve apertures and at its tangentially-directed supply inlet 16 (Figures 2 and 3). Consequently the air, rotating in this inlet passage without obstruction, tends to enter the cylinder tangentially through half of the peripherally-disposed segment of each of the four intake apertures 26. The air's tangential component is made more pronounced by shrouds 28 (Figure 4; also 1 and 2) over that half of each peripheral segment which is first reached by air rotating in inlet passage 20, shrouds of other designs being of course optional.

Supply inlet 18 for the combustible mixture is directed radially into the central inlet passage 22, whose lower part is annular and coaxial with the cylinder. Hence the combustible mixture enters the cylinder symmetrically from all sides and disposes itself symmetrically about the cylinder axis and within the cylindrical layer of air which is rotating next to the cylinder periphery. Whatever of the mixture enters in a clockwise direction is neutralized by an equal amount entering counterclockwise. Thus the combustible mixture has no tendency to rotate about the axis, with the result that it is very well stratified from the rotating air charge.

With inlet passages and openings of this design, therefore, the non-rotating combustible mixture uses about one half of the total area of each valve aperture, the rotating air uses about another quarter.

If, as would normally be the case with spark-ignition engines, the combustible mixture is already of the proper air-fuel ratio for most efficient combustion, the problem is to prevent dilution of the combustible mixture by the rotating air during the latter part of the compression stage, while still providing the turbulence necessary for top efficiency during the early part of the combustion stage. This problem is solved by replacing compression turbulence with combustion turbulence. To this end the piston head should preferably have no considerable area that is both parallel to the cylinder head and of much less clearance at inner dead center than the average clearance for the piston head as a whole. Though many forms of piston head would meet this qualification, the preferred form is that shown in Figure 1. On the compression stroke its convex outer surface displaces the peripheral air so gradually as to cause very little mixing of the air charge with the combustible charge which is nearer the cylinder axis. Combustion turbulence is obtained by the use of precombustion chamber 12. During compression none of the outside rotating air can enter this chamber, until all the inside non-rotating combustible mixture has first entered; and the chamber is preferably of so small a size as to accommodate only the combustible mixture, even when the engine is idling. When the piston is near inner dead center, the combustible mixture in precombustion chamber 12 is ignited by spark plug 34, and then is forced out at high pressure through the narrow neck 14 into the cylinder, causing the sought-for turbulence. Since the gases ejected from the precombustion chamber sweep along with them some of the gases in the upper and central portions of the compression chamber, they cause these latter gases to move from all sides toward the cylinder axis and then down parallel thereto; and when the ejected gases hit the symmetrical and pointed piston head and are deflected in all directions away from the cylinder axis, they cause the adjacent gases to move in the same centrifugal direction. The combination of gases at the top of the compression chamber moving radially toward the cylinder axis and of gases at the bottom of the compression chamber moving radially away from that axis gives to these central gases a radial rotation.

For a four-stroke cycle, spark-ignition engine with exhaust valves in the cylinder head, the inlet passages described in the foregoing paragraphs must be somewhat modified. The cylinder head 58, as shown in Figures 5-7, has two exhaust poppet valves 78, 78 operated by suitable means (not shown), having normal clearance on all sides of their heads (Figure 5), and opening into exhaust passage 80; and it also has two intake poppet valves 74, 74 operated by suitable means (not shown), having a minimum of clearance between their heads and the cylinder periphery, and opening both from inlet passage 68 for the air and from inlet passage 70 for the combustible mixture. These inlet passages are separated from each other by a partition 72 which is arcuate about the cylinder axis and which divides the entrance to the aperture of each valve 74 into two segments. One of these segments faces the periphery of the cylinder, and delivers air from inlet passage 68 to the cylinder's peripheral region; the other segment faces the cylinder's axis, and delivers the combustible mixture from inlet passage 70 to its axial region. The lower inside edge of the partition 72 is close to the stems of the valves 74; and the bottom edge of this partition fits and just clears the back surface of the head of each valve 74 when the valve is seated, for preventing interflow between the passages 68 and 70. For stream-line flow of air partition 72 is outside the stems of valves 74, the inner surface of inlet passage 68 being substantially uniform in all cross-sections through said arcuate partition; the outer wall of inlet passage 68 curves spirally inward toward the peripheral segment of that intake valve 74 which is furthest from the supply inlet 64; and its upper wall curves downward toward the same valve (Figure 7, compared with Figure 5). Thus the air tends to enter the cylinder tangentially, counterclockwise, through half of the peripheral segment of each of the two intake valves 74. The air's tangential component is made more pronounced by shrouds 76 integral with the cylinder head (Figures 5 and 6), which are similar to that shown in Figure 4, covering that part of each peripheral segment which is first reached by the air flowing in inlet passage 68.

Supply inlet 66 for the combustible mixture is directed preferably both toward the cylinder axis and toward the mid-point of inlet passage 70. From this passage the mixture enters the cylinder downward equably through the segments of the intake valves 74 that face the cylinder axis. Being thus admitted radially from but one side of the cylinder axis, the mixture is directed toward the opposite wall of the cylinder along about one half of its periphery and tends to assume a non-rotating asymmetrical shape. The air, however, simultaneously entering the cylinder tangentially and rotating rapidly, shapes the body of combustible mixture into a truncated cone, or even a cylindrical column, which is coaxial with the cylinder and which has one base in contact with the cylinder head. During both the intake and the compression stages, therefore, the combustible mixture remains in the axial region of the cylinder, its only motion being along the cylinder axis through the narrow neck 62, which is coaxial with the cylinder, into precombustion chamber 60. Since the rotating peripheral air cannot reach this chamber until all the non-rotating central fuel mixture has done so, and since this chamber is preferably of so small a size as to accommodate only the fuel mixture, even when the engine is idling, the fuel mixture that does reach it retains its original air-fuel ratio. Hence the ignition there by a spark plug (not shown) is positive, and the combustion efficient. Thereafter operation is the same as with the structure shown in Figures 1-3.

Although the foregoing description has assumed a combustible mixture of normal air-fuel proportions, my invention is not limited to mixtures so proportioned. A gaseous fuel may also be used, or a fuel mixture which is too rich to be spark-ignited until it has become mixed with some of the excess air near the inner end of the stroke in a precombustion chamber of much greater relative volume than that of the precombustion chambers described above. Nor is my invention restricted to spark-ignition engines. When it is applied to compression-ignition engines, the fuel that is to be admitted through the segments of the valve apertures which face the cylinder's axis may be an unmixed gaseous fuel, or it may be gaseous, liquid, or finely divided solid fuel mixed with air or some other gas. So, too, though the gas admitted tangentially to the cylinder would usually be air, it can instead be a lean fuel mixture, and, at high speeds and loads, a mixture of normal air-fuel proportions. Hence the appended claims speak not of "fuel mixture" and of "air," but of a "combustible gas" and a "combustion-supporting gas."

While the foregoing paragraphs mention, and the accompanying drawings show, only a single cylinder, my invention may of course be applied to engines with any number of cylinders.

I claim:

1. Means for induction of working gases into a reciprocating internal combustion engine having at least one admission-controlling poppet valve located off-axis in the cylinder head, comprising, for each said valve, in combination with the engine cylinder, two gas inlet passages in the cylinder head, the one being located nearer the cylinder periphery and the other located nearer the cylinder axis, and a partition separating these passages from each other, passing over the back surface of the head of the said valve and dividing the entrance to the aperture of that valve into a segment which faces the periphery of the cylinder and a segment which faces the axis of the cylinder; the said passage which is peripherally disposed having a discharge opening at the said peripheral segment, having a pronounced component which is tangential to the cylinder's peripheral region, and serving a combustion-supporting gas; and the said passage which is axially disposed having a discharge opening at the said axial segment, having a pronounced component which is radial toward the cylinder axis, and serving a combustible gas; whereby, during the intake stage and the first and greater part of the compression stage in the cylinder, a body of the said combustible gas may both be segregated from and be in contact with a body of the said combustion-supporting gas rotating around it.

2. Means for induction of gases as in claim 1, further characterized in that the bottom of the said partition fits and just clears the back surface of the head of each said admission-controlling valve over which it passes, when the said head is seated.

3. Means for induction of gases as in claim 1, further characterized in that there is a plurality of said admission-controlling valves; and the said partition is on the cylinder's peripheral side of the stems of those valves, excluding said stems from the said passage which is the nearer to the cylinder's periphery.

4. Means for induction of gases as in claim 1, further characterized in that there is a plurality of said admission-controlling valves; the said partition is concentric about the cylinder axis and is on the cylinder's peripheral side of the stems of those valves, excluding said stems from that said inlet passage which is the nearer to the cylinder's periphery; this last said inlet passage being of substantially uniform cross-section; and there being a supply passage for it which delivers into it tangentially.

5. Means for induction of gases as in claim 1, further characterized in that there is a plurality of said admission-controlling valves; the said partition is concentric with the cylinder axis and is on the cylinder's peripheral side of the stems of the said valves; the peripheral inlet passage being annular in course and substantially uniform in cross-section, and having a supply passage tangential to it; there being at least two of said openings from the inlet passage into at least two said peripherally-disposed segments of apertures in the valves of said plurality of valves, for this single annular inlet passage to permit continuous flow of its gaseous contents.

6. Means for induction of gases as in claim 1, further characterized in that there is a plurality of said admission-controlling valves; the said partition is arcuate about the stems of those valves, excluding said stems from that said inlet passage which is the nearer to the cylinder's periphery; this last said inlet passage having a tangential connection to a source of supply of combustion-supporting gas; and having its outer wall curving spirally inward toward the peripheral segment of the last of the intake valves which it serves.

7. Means for induction of gases as in claim 1, further characterized in that there is a plurality of said admission-controlling valves; and in that the surfaces adjoining the said axis-facing segments are located to deflect the streams of incoming combustible gas against each other, thereby diminishing both their velocities across the cylinder axis and their intermixture with the combustion supporting gases that rotate nearer the cylinder's periphery.

8. Means for induction of gases as in claim 7, further characterized in that a supply passage to that inlet passage which feeds the axis-facing segments of apertures has its discharge end symmetrical with respect to the valves which it serves.

LOCKWOOD MYRICK.

REFERENCES CITED

The following references are of record in the file of this patent:

UNITED STATES PATENTS

| Number | Name | Date |
| --- | --- | --- |
| 1,245,511 | Riotte | Nov. 6, 1917 |
| 1,342,449 | Konar | June 8, 1920 |
| 2,018,848 | Gruebler | Oct. 29, 1935 |
| 2,107,389 | Price et al. | Feb. 8, 1938 |
| 2,127,692 | Lothrop | Aug. 23, 1938 |
| 2,196,860 | Groth | Apr. 9, 1940 |

FOREIGN PATENTS

| Number | Country | Date |
| --- | --- | --- |
| 237,637 | Germany | Aug. 25, 1911 |